(12) United States Patent
Ashdown et al.

(10) Patent No.: US 7,894,050 B2
(45) Date of Patent: Feb. 22, 2011

(54) METHOD AND APPARATUS FOR DETERMINING INTENSITIES AND PEAK WAVELENGTHS OF LIGHT

(75) Inventors: Ian Ashdown, West Vancouver (CA); Shane Robinson, Gibsons (CA); Marc Salsbury, Vancouver (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 11/814,472

(22) PCT Filed: Nov. 17, 2006

(86) PCT No.: PCT/CA2006/001875

§ 371 (c)(1),
(2), (4) Date: Jan. 2, 2008

(87) PCT Pub. No.: WO2008/009093

PCT Pub. Date: Jan. 24, 2008

(65) Prior Publication Data

US 2009/0303467 A1    Dec. 10, 2009

Related U.S. Application Data

(63) Continuation-in-part of application No. 11/436,974, filed on May 19, 2006.

(60) Provisional application No. 60/683,436, filed on May 20, 2005, provisional application No. 60/807,914, filed on Jul. 20, 2006.

(30) Foreign Application Priority Data

Jul. 18, 2006    (CA) .................................. 2552133

(51) Int. Cl.
*G01J 1/42*    (2006.01)

(52) U.S. Cl. ...................................... 356/224; 356/419
(58) Field of Classification Search ....................... None
See application file for complete search history.

(56) References Cited

U.S. PATENT DOCUMENTS 3,987,298 A    10/1976    Rotolante (Continued)

FOREIGN PATENT DOCUMENTS

WO    WO 98/36252 A1    8/1998

OTHER PUBLICATIONS

Ashdown, I., "Chromaticity and Color Temperature for Architectural Lighting," *Proceedings of Solid State Lighting II*, SPIE vol. 4776, pp. 61-60, 2002.

(Continued)

*Primary Examiner*—Gregory J Toatley
*Assistant Examiner*—Juan D Valentin

(57) ABSTRACT

The present invention provides a method and apparatus for determining intensities and peak wavelengths of light. The apparatus comprises one or more pairs of sensing units for sensing the light, a first sensing unit of a pair configured to sense a first intensity of the light in a first predetermined wavelength range with a first predetermined spectral responsivity and a second sensing unit of a pair configured to sense a second intensity of the light in the first predetermined wavelength range with a second predetermined spectral responsivity. The apparatus further comprises a processing system operatively connected to the one or more pairs of sensing units; the processing system configured to determine the intensity and peak wavelength for each of the one or more predetermined wavelength ranges of the light according to one or more predetermined functional relationships between each of the first intensity and second intensity.

21 Claims, 13 Drawing Sheets

U.S. PATENT DOCUMENTS

| | | | |
|---|---|---|---|
| 4,011,016 | A | 3/1977 | Layne et al. |
| 4,238,760 | A | 12/1980 | Carr |
| 4,308,456 | A | 12/1981 | Van Der Gaag et al. |
| 4,309,604 | A | 1/1982 | Yoshikawa et al. |
| 4,692,025 | A * | 9/1987 | Tani et al. ................... 356/45 |
| 4,833,332 | A | 5/1989 | Robertson, Jr. et al. |
| 4,904,088 | A | 2/1990 | Blazek et al. |
| 5,424,545 | A * | 6/1995 | Block et al. ................. 356/405 |
| 6,127,783 | A | 10/2000 | Pashley et al. |
| 6,727,521 | B2 | 4/2004 | Merrill |
| 6,753,994 | B1 | 6/2004 | Russell |
| 6,841,816 | B2 | 1/2005 | Merrill et al. |
| 6,864,557 | B2 | 3/2005 | Turner et al. |
| 7,140,752 | B2 | 11/2006 | Ashdown |
| 7,220,959 | B2 * | 5/2007 | Nishimura ................... 356/402 |
| 7,388,665 | B2 * | 6/2008 | Ashdown ..................... 356/419 |
| 2004/0022282 | A1 | 2/2004 | Lano et al. |
| 2005/0062446 | A1 | 3/2005 | Ashdown |

OTHER PUBLICATIONS

Ashdown, I., "Neural Networks for LED Color Control," *Proceedings of Solid State Lighting III*, SPIE vol. 5187, pp. 215-226, 2003.

Bhalotra, S. R. 2004. Adaptive Optical Miscrospectrometers and Spectral-Selective Sensing. PhD thesis, Department of Applied Physics, Stanford University.

CIE. 2004. Colorimetry. CIE 15.3-2004. Vienna, Austria: International Commission on Illumination.

CIE. 2007. Measurement of LEDs. CIE 127-2007. Vienna, Austria: International Commission on Illumination.

Demarsh, L., "TV Display Phosphors/Primaries—Some History," *SMPTE Journal*, 102:1095-1098, Dec. 1993.

Deverse, R. A. et al., "Realization of the Hadamard Multiplex Advantage Using a Programmable Optical Mask in a Dispersive Flat-Field Near-Infrared Spectrometer," *Applied Spectroscopy*, vol. 54, No. 12, pp. 1751-1758, 2000.

Drew, Mark S. et al., "Device—Independent Color via Spectral Sharpening," Proc. Second Color Imaging Conference: Color Science, Systems and Applications, IS&T/SID, pp. 121-126, 1994.

Drew, Mark S. et al., "Spectral Sharpening with Positivity," *Journal of the Optical Society of America*, vol. 17, No. 8, pp. 1361-1370, 2000.

Ebu, *E. B. U. Standard for Chromaticity Tolerances for Studio Monitors*. Technical Publication 3213-E, European Broadcasting Union, Geneva, Switzerland, Aug. 1975.

Eppeldauer, G. P. et al., "Design and Characterization of a Photometer-Colorimeter Standard," *Applied Optics*, vol. 43, No. 13, pp. 2621-2631, May 2004.

Folkerts, W., "LED Backlighting Concepts with High Flux LEDs," *SID 04 Digest*, pp. 1226-1229, 2004.

Hamamatsu. Color Sensor Module C9303—RGB-LED Backlight Monitor for TFT-LCD (Liquid Crystal Display). Hamamatsu City, Japan: Hamamatsu Photonics K. K., 2004.

Harbers, G. W. et al., "LED Backlighting for LCD HDTV," *Journal of the Society for Information Display*, vol. 10, No. 4, pp. 347-350, 2002.

ITU, *Parameter Values for the HDTV\* Standards for production and International Programme Exchange*, ITU-R Recommendation BT.709-5, International Telecommunication Union, Geneva, Switzerland, 1990.

Jenkins, D. R. et al., "Digital Imaging Colorimeter for Fast Measurement of Chromaticity Coordinate and Luminance Uniformity of Displays," Proceedings of Flat Panel Display Technology and Display Metrology II, *SPIE*, vol. 4295, pp. 176-187, 2001, Bellingham, WA: International Society for Optical Engineering.

Jiang, C. et al., "Factors Affecting Fluorescent Backlight Operation," *Proceedings of Nonimaging Optics: Maximum Efficiency Light Transfer III*, vol. 2538, pp. 51-60, 1995, SPIE.

Knipp, D. et al., "Thin Film Technology Based Micro-Fourier Spectrometer," Proceedings of Conference on MOEMS and Miniaturized Systems III, Jan. 2003, San Jose, CA.

Kohns, P. et al., "High-Precision Low-Cost Colorimeters and Spectrophotometers Based on Liquid Crystalline Optics," Proceedings of XV Conference on Liquid Crystals, SPIE vol. 5565, pp. 332-337, 2004, Bellingham, WA: International Society for Optical Engineering.

Kung, H. L. et al., "Standing-Wave Transform Spectrometer Based on Integrated MEMS Mirror and Thin-Film Photodetector," *IEEE Journal on Selected Topics in Quantum Electronics*, vol. 8, No. 1 pp. 98-105, 2002.

Leonardis, A. et al., An Efficient MDL-Based Construction of RBF Networks, Neural Networks, vol. II, pp. 963-973, 1998.

Lowe, David, "Adaptive Radial Basis Function Nonlinearities, and the Problem of Generalisation," First IEEE International Conference on Artificial Networks, 1989.

Lu, Y. et al., "Liquid-Crystal-Based Fourier Optical Spectrum Analyzer without Moving Parts," *Japanese Journal of Applied Physics*, vol. 44, No. 1A, pp. 291-293, 2005.

Lumileds, *Lumileds Seattle Seminar Notes*, Lumileds Lighting LLC, San Jose, CA, 2002.

Lumileds, *Luxeon Product Binning and Labelling*, Technical Datasheet AB21, Lumileds Lighting LLC, San Jose, CA, 2002.

Magnusson, R. et al., "New Principles for Optical Filters," *Applied Physics Letters*, vol. 61, No. 9, pp. 1022-1024, 1992.

Man, K. et al., "Accurate Colorimetric Feedback for RGB LED Clusters," *Proceedings of Solid State Lighting VI*, SPIE vol. 6337, 2006.

Miller, P. J. et al., "Use of Tunable Liquid Crystal Filters to Link Radiometric and Photometric Standards," *Metrologia*, vol. 28. No. 3, pp. 145-149, 1991.

Ocli, SelectraBand Linear Variable Filters, 2004, Santa Rosa, CA: JDS Uniphase Corporation.

Peng, S. et al., "Experimental Demonstration of Resonant Anomalies in Diffraction from Two-Dimensional Gratings," *Optics Letters*, vol. 21, No. 8, pp. 549-551, Apr. 1996.

Perdujin, A. et al., "Light Output Feedback for RBG LED Backlight Applications", *SID Symposium Digest of Technical Papers*, vol. 34, No. 1, pp. 1254-1257, 2003.

SMPTE, *SMPTE C Color Monitor Colorimetry*, SMPTE Recommend Practice 145-2004, Society of motion Picture and Television Engineers, White Plains, NY, 2004.

Sander, D. et al., "Microspectrometer with Slab-Waveguide Transmission Gratings", *Applied Optics*, vol. 35, No. 21, pp. 4096-4101, Jul. 20, 1996.

Sigiura, H. et al., Wide Color Gamut Monitors—LED Backlighting LCD and New Posphor CRT, *Proceedings of Liquid Crystal Materials, Devices and Applications X and Projection Displays X*, SPIE-IS& T, vol. 5289, pp. 151-160, 2004.

Sugiura, H. et al., "Six-primary-color LCD monitor using six-color LEDs with an accurate calibration system", *Color Imaging XI: Processing Hardcopy, and Applications*, IPE-IS-&T, vol. 6058, pp. 143-150, 2005.

TAOS. 2004. TAOS TCS230 Programmable Color Light-to-Frequency Converter. Plano, TX: Texas Advanced Optoelectronic Solution Inc.

Vohsbeck-Petermann, R. "Development and Construction of a Low-Cost Colorimeter", Proceedings of Imaging Science and Display Technologies, *SPIE*, vol. 2949, pp. 99-101. Bellingham, WA: International Society for Optical Engineering, 1997.

Wang, Y. et al., "Surface Plasom Tunable Filter and Spectrometer-on-a-Chip", Proceedings of Imaging Spectrometry III, *SPIE*, vol. 3118, pp. 288-294, Bellingham, WA: International Society for Optical Engineering, 1997.

Yee, G. M. et al., "Miniature Spectrometers for Biochemical Analysis", Proceedings of Micro- and Nanofabricated Electro-Optical Mechanical Systems for Biomedical and Environmental Applications, *SPIE*, vol. 2978, pp. 75-81, Bellingham, WA: International Society for Optical Engineering, 1997.

Zavracky, P. M. et al., "A Micromachined Scanning Fabry-Perot Interferometer", Proceedings of Micromachined Devices and Components IV, *SPIE*, vol. 3514, pp. 179-187, 1998.

Zukauskas, A. et al., Introduction to Solid-State Lighting, New York, NY: Wiley-Interscience, 2002.

\* cited by examiner

US 7,894,050 B2

METHOD AND APPARATUS FOR DETERMINING INTENSITIES AND PEAK WAVELENGTHS OF LIGHT

FIELD OF THE INVENTION

The present invention relates to optical sensing systems and more particularly to a method and apparatus for determining intensities and peak wavelengths of light.

BACKGROUND

It is well known in the art that the light emitted from artificial light sources can change in characteristics depending on a number of factors such as operating temperature and aging of the light source, for example. While technology is improving and light-emitting diodes (LEDs) are being used in increasing numbers of various types of space lighting applications, contemporary high-power LEDs are specifically prone to operating temperature induced colour shifts. Among the different material systems which are used today to implement high-power LEDs which emit various different coloured light, those used for implementing red LEDs are typically most sensitive to changes in temperature. Many multi-colour LED based luminaires therefore require control systems with a form of optical feedback to be able to maintain reasonably stable light emissions. In particular, it is advantageous to measure both the intensity and peak wavelength of light.

Methods and apparatuses for the detection of the light which is emitted by a specific LED or type of LED, for example, in a luminaire under operating conditions, are widely known in the art and readily available. In addition, the operating principles of these devices are described in a number of publications. Many of these solutions, however, suffer from various types of downfalls, most often cost-inefficiency.

For example, U.S. Pat. No. 4,904,088 describes a method and apparatus for determining radiation wavelengths and wavelength-corrected radiation power of monochromatic light sources. It provides an optoelectronic measuring method for determining the wavelength and the wavelength-corrected power of monochromatic light sources. Photodetectors of different spectral overall responsivity are acted upon by the flow of radiation of the light source to be measured through a transfer device. Signals are then produced and transmitted to a calculation unit via a unit for acquiring and processing the measurement values. From the above signals a wavelength-specific quantity is derived in the calculation unit which is compared with the wavelength-specific data present in the memory unit after one calibration. Thus, the actual wavelength of the light source to be measured can be determined, indicated by an indicator unit, or supplied through a data interface. When the actual wavelength is known, a wavelength-specific correction factor can be interrogated in the memory unit, and a wavelength-corrected power can be calculated in the calculation unit. This apparatus for determining radiation wavelengths and wavelength-corrected radiation power is configured for monochromatic light sources and may be complex and potentially cost prohibitive for generic lighting applications.

U.S. Pat. No. 4,309,604 describes a solid state wavelength detection system which can respond to output signals derived from a photoelectric semiconductor device. The photoelectric semiconductor device comprises at least two PN junctions formed at different depths from the surface of the semiconductor substrate. A deeper PN junction develops an output signal related to longer wavelength components of the light impinging thereon. A shallower PN junction develops an output signal related to shorter wavelength components of the impinging light. These two output signals are logarithmically compressed and compared with each other. The difference of the logarithmically compressed output signals represents the wavelength information of the impinging light. The photoelectric semiconductor device however, may be complicated and expensive to fabricate due to the multiple PN junctions and therefore may be cost prohibitive for common applications.

United States Patent Application Publication No. 2004/0022282 describes an arrangement for monitoring the main radiation beam emitted by an optical source such as a laser diode having a nominal emission wavelength. The arrangement includes first and second photodetectors as well as a wavelength selective element. A beam splitter module is provided for splitting a secondary beam from the main radiation beam of the laser source and directing it towards the first photodetector via the associated wavelength selective element. The wavelength selective element has a wavelength selective transmittance-reflectance characteristic, whereby said secondary beam is partly propagated towards said first photodetector and partly reflected from said wavelength selective element towards the second photodetector. The output signals from the photodetectors have intensities whose behaviours are a function of wavelength and are complementary to each other. Signal processing circuitry is further provided including an adder module and a subtractor module fed with the output signals from the photodetectors to generate a wavelength-independent sum signal, indicative of the intensity of the optical radiation generated by the optical source, and a wavelength-dependent difference signal, indicative of the difference between the actual wavelength of the radiation generated by said optical source and its nominal emission wavelength. This arrangement however, may be complicated and cost prohibitive and may not be easily integrated into a lighting device.

Therefore there is a need for a new and cost effective method and apparatus for determining intensities and peak wavelengths of light.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for determining intensities and peak wavelengths of light. In accordance with one aspect of the present invention there is provided an apparatus for determining intensities and peak wavelengths in one or more predetermined wavelength ranges of light, the apparatus comprising: one or more pairs of sensing units for sensing the light, a first sensing unit of a pair configured to sense a first intensity of the light in a first predetermined wavelength range with a first predetermined spectral responsivity and a second sensing unit of a pair configured to sense a second intensity of the light in the first predetermined wavelength range with a second predetermined spectral responsivity; and a processing system operatively connected to the one or more pairs of sensing units, the processing system configured to determine the intensity and peak wavelength for each of the one or more predetermined wavelength ranges of the light according to one or more predetermined functional relationships between each of the first intensity and second intensity.

In accordance with another aspect of the present invention there is provided a method for determining intensity and peak wavelength of light in a predetermined wavelength range, the method comprising the steps of: sensing a first intensity of the light in the predetermined wavelength range with a first predetermined spectral responsivity; sensing a second intensity of the light in the predetermined wavelength range with a second predetermined spectral responsivity; and determining the intensity and peak wavelength in the predetermined wavelength range using a predetermined functional relationship between the first intensity and the second intensity.

In accordance with another aspect of the present invention, there is provided an apparatus for determining intensity and peak wavelength in a predetermined wavelength range of light, the apparatus comprising: a first sensing unit for sensing the light, the first sensing unit configured to sense a first intensity of the light in the predetermined wavelength range with a first predetermined spectral responsivity; and a processing system operatively connected to the first sensing unit, the processing system configured to analytically sharpen the first predetermined spectral responsivity of the first sensing unit, thereby generating a second intensity of the light, the processing system further configured to determine the intensity and peak wavelength for the predetermined wavelength range of light according to one or more predetermined functional relationships between the first intensity and second intensity.

DETAILED DESCRIPTION OF THE INVENTION

Definitions

Figure 1:
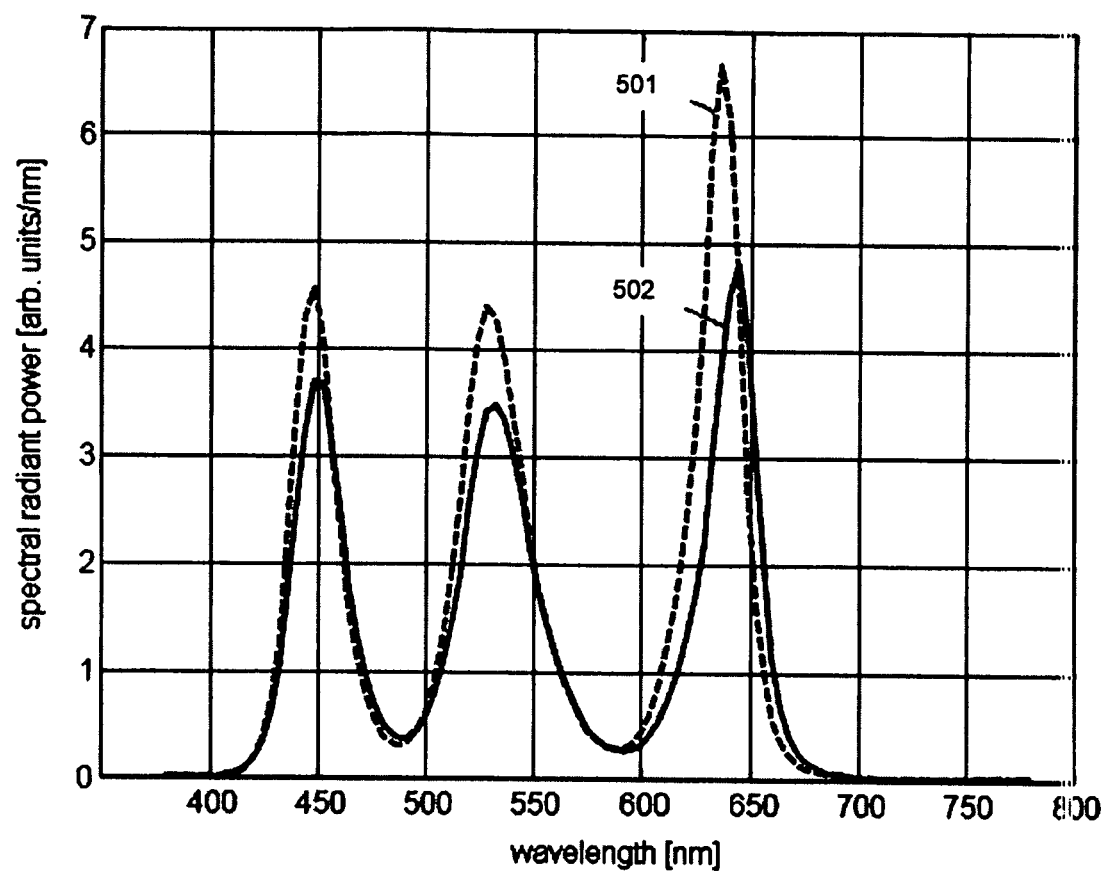
FIG. 1 illustrates example spectra of mixed light from three LEDs under two different operating conditions.

The term "light-emitting element" (LEE) is used to define any device that emits radiation in any region or combination of regions of the electromagnetic spectrum for example, the visible region, infrared and/or ultraviolet region, when activated by applying a potential difference across it or passing a current through it, for example. Therefore a light-emitting element can have monochromatic, quasi-monochromatic, polychromatic or broadband spectral emission characteristics. Examples of light-emitting elements include semiconductor, organic, or polymer/polymeric light-emitting diodes, optically pumped phosphor coated light-emitting diodes, optically pumped nano-crystal light-emitting diodes or other similar devices as would be readily understood by a worker skilled in the art. Furthermore, the term light-emitting element is used to define the specific device that emits the radiation, for example a LED die, and can equally be used to define a combination of the specific device that emits the radiation together with a housing or package within which the specific device or devices are placed.

The term "intensity" is used to define the quotient of radiant or luminous flux leaving a light source and propagated in an element of solid angle containing a given direction by the element of the solid angle, according to standards of the Commission Internationale de l'Eclairage™ (CIE).

The term "chromaticity" is used to define the perceived colour impression of light according to standards of the Commission Internationale de l'Eclairage™ (CIE).

The term "gamut" is used to define the plurality of chromaticity values that a luminaire is able to achieve.

The term "spectral radiant flux" is used to define the radiant power per unit wavelength at a wavelength $\lambda$.

The term "spectral power distribution" is used to define the distribution of spectral radiant flux over a predetermined range of wavelengths, according to standards of the Commission Internationale de l'Eclairage™ (CIE).

The term "peak wavelength" is used to define the wavelength at the maximum of a given spectral power distribution, according to standards of the Commission Internationale de l'Eclairage™ (CIE).

The term "spectral responsivity" is used to define the responsivity of a sensor per unit wavelength at a wavelength $\lambda$.

The term "spectral resolution" is used to define the minimum separation between two different wavelengths in the optical spectrum as distinguishable by the sensor. This is quantified by separation $\Delta\lambda$, where $\lambda$ is the measurement wavelength.

As used herein, the term "about" refers to a +/−10% variation from the nominal value. It is to be understood that such a variation is always included in any given value provided herein, whether or not it is specifically referred to.

Unless defined otherwise, all technical and scientific terms used herein have the same meaning as commonly understood by one of ordinary skill in the art to which this invention belongs.

The present invention provides a method and apparatus for determining intensities and peak wavelengths of light. The invention can be used in a number of different applications.

For example, it can be embedded in a feedback control system for monitoring and stabilizing light emissions from a multi-colour LEE-based luminaire or it can be used in a standalone spectroscopy application for investigating the light emitted by another type of light source.

The apparatus for determining intensities and peak wavelengths of light comprises a processing system and one or more pairs of sensing units. Each sensing unit of a pair provides a different responsivity within a predetermined wavelength range, for example the red wavelength portion, green wavelength portion, blue wavelength portion or the like. Each sensing unit of the pair senses light within the predetermined wavelength range, and each sensing unit of the pair generates a signal which is indicative of an intensity within the predetermined wavelength range of the sensed light based on the responsivity of the specific sensing unit.

The processing system is connected to the one or more pairs of sensing units and it can control and acquire data from them. The processing system utilizes certain functional relationships between the spectral responsivities of each sensing unit of a pair that correlate the acquired intensities per sensing unit of a pair of sensing units to determine the peak wavelength and total intensity of the emitted light within the predetermined wavelength range. In one embodiment of the present invention, the spectral responsivities of each sensor unit of a pair are selected in order that the relationship between their respective output provides a desired level of resolution for identifying peak wavelengths of the one or more light-emitting elements generating light within the predetermined wavelength range, thereby enabling optical feedback to a control system or controller for maintaining or obtaining a desired colour of light.

In one embodiment, an apparatus according to the present invention can provide a means for the evaluation of emission wavelength shift of the one or more light-emitting elements generating light within the predetermined wavelength range.

FIG. 1 illustrates example spectra of a multi-colour LEE based luminaire with three different colour LEEs under operating conditions $T_1$ 501 and $T_2$ 502. The general nature of light with narrow-band multi-colour components can be identified as illustrated in FIG. 1.

With further reference to FIG. 1, variations in the light emitted from a three colour LEE-based luminaire with changing operating temperature can also be identified. For illustration purposes the operating temperature conditions of this LEE-based luminaire are simplified to be equal for all three colour LEEs. The operating temperatures are denoted by $T_1$ 501 and $T_2$ 502 with $T_1$ 501 greater than $T_2$ 502. For various reasons which are rooted in the characteristics of the materials which are used to fabricate LEEs, the spectral composition of the light emitted by a LEE generally exhibits red-shifting and spectral broadening with increasing operating temperature. The amounts by which the peak wavelengths shift to higher wavelengths, or lower energies, is generally larger for red LEEs than for green and blue LEEs because of the characteristics of the type of material used to fabricate these different colours of LEEs. It is noted that other LEEs based on other material systems may exhibit different characteristics.

Sensing Units

In order to be able to resolve a certain number of peaks in the spectrum of sensed light, an apparatus according to the present invention requires one or more pairs of sensing units for each of the peaks to be resolved. In an embodiment of the present invention, the number of pairs of sensing units per apparatus can be larger, for example, if the apparatus is used to monitor individual LEEs for feedback control of a LEE-based luminaire. Each sensing unit of a pair is characterized by different spectral responsivity to light within a predetermined wavelength range. In an embodiment, outside the predetermined wavelength range, the spectral responsivity of each sensing unit of a pair can be substantially zero.

Each sensing unit can be configured in a number of different ways, provided that a specific sensing unit is spectrally responsive within a selected predetermined wavelength range. In one embodiment of the present invention, a sensing unit can be configured as a combination of a broadband optical sensor together with a filter, wherein the configuration of the filter can define the predetermined wavelength range. In this manner a filter can substantially block light having wavelengths outside of the predetermined wavelength range.

In another embodiment, a sensing unit can be configured as a narrow band optical sensor with a spectral responsivity within the predetermined wavelength range. In an further embodiment, a sensing unit can be configured as a narrow band optical sensor with a variable spectral responsivity, wherein a sensing unit may be tuned to collect information indicative of emitted light within different predetermined wavelength ranges.

In an embodiment of the present invention, a pair of sensing units are configured in order that their spectral responsivity is complementary, wavelength shifted, or the like, within the predetermined wavelength range to which the pair of sensing units is predominantly responsive.

In an embodiment of the present invention, the relative spectral responsivity of each sensing unit of a pair is substantially similar however the spectral responsivities are wavelength shifted relative to one another. The relative wavelength shift between the spectral responsivities of a pair of sensing units can be configured to be a portion of or equal to the predetermined wavelength range. For example, in an embodiment of the present invention, a first sensing unit has a first spectral responsivity and the second sensing unit of the pair has a spectral responsivity that has been wavelength shifted by a predetermined amount above or below that of the first sensing unit. For example, the predetermined amount can be between 1 and 40 nm, 5 and 30 nm, 10 and 20 nm or the like. The selection of a relative wavelength shift of spectral responsivity of a sensing unit of a pair of sensing units can be selected in order that the evaluation of the peak wavelength of the emitted light within the predetermined wavelength range can be determined with a desired level of accuracy.

Figure 2:
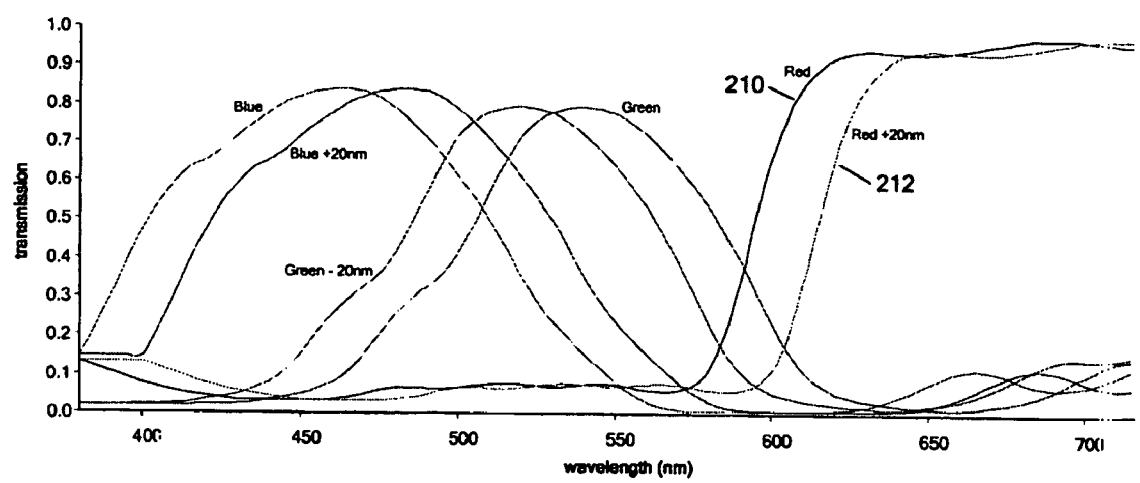
FIG. 2 illustrates example spectral transmissivities of optical filters for use with sensing units according to one embodiment of the present invention.

In an embodiment of the present invention, and having regard to FIG. 2 which illustrates example spectral transmissivities of six optical filters which can be used in combination with broadband sensors to implement six sensing units, which can form three pairs of sensing units. Each of the three pairs of sensing units are configured to be responsive to respective predetermined wavelength range, and in this example these predetermined wavelength ranges are the red wavelength region, blue wavelength region and the green wavelength region. In this embodiment of the present invention, the spectral responsivity of each sensing unit of a pair are substantially identical, wherein a 20 nm wavelength shift in the relative spectral responsivity is provided between a first sensing unit of a pair and a second sensing unit of the pair. In this embodiment, and having particular regard to the predetermined wavelength range being the red wavelength region, the pair of sensing units comprises a first sensing unit formed from a broadband optical sensor and an optical filter having a transmissivity as defined bit 210 and a second sensing unit formed from a broadband optical sensor and an optical filter having a transmissivity as defined by 212.

Figure 3:
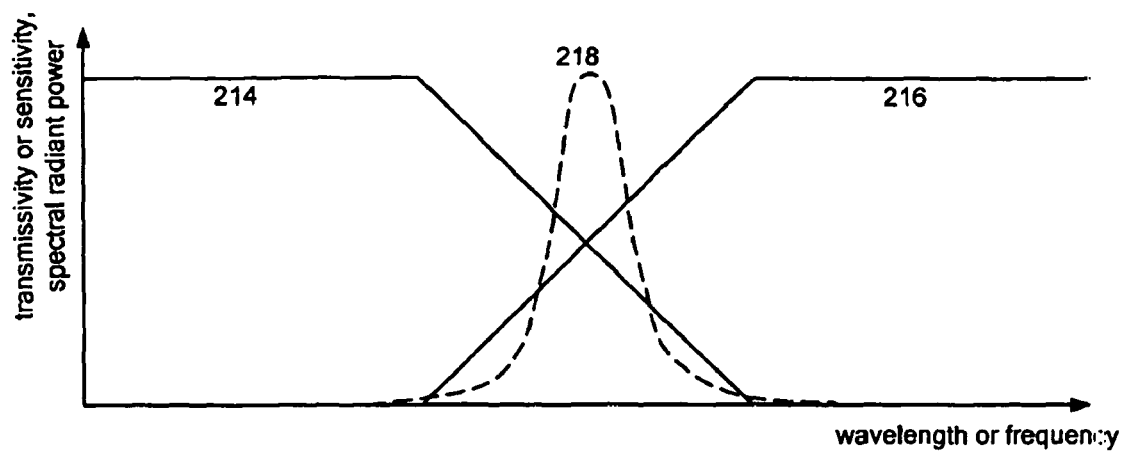
FIG. 3 illustrates responsivity characteristics of a pair of sensing units according to one embodiment of the present invention along with an example spectral radiant power distribution.

In another embodiment of the present invention, a pair of sensing units can be configured to have spectral responsivities as illustrated in FIG. 3. In this configuration a first sensing unit has a spectral responsivity 214 which is substantially constant for a first portion and ramps down over a defined wavelength region to substantially zero. A second sensing unit has a spectral responsivity 216 which is substantially zero for a first portion and ramps up over the defined wavelength region, to a substantially constant level. This defined wavelength region can be a part or all of the predetermined wavelength range. In one embodiment the defined wavelength region is the expected spectral radiant power distribution 218 of the light to be sensed. In this configuration of a pair of sensing units, the spectral responsivity of the individual sensing units is substantially complementary.

Figure 4:
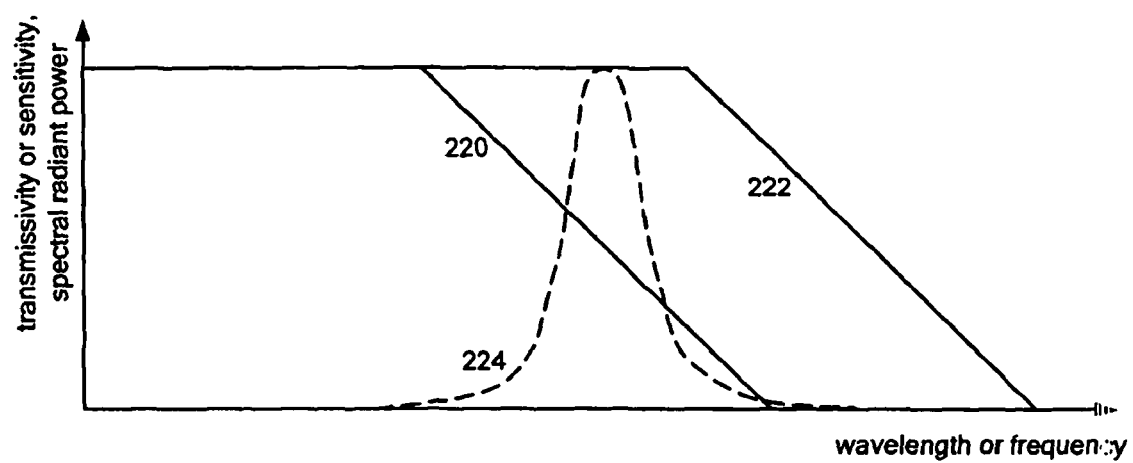
FIG. 4 illustrates responsivity characteristics of a pair of sensing units according to another embodiment of the present invention along with an example spectral radiant power distribution.

In another embodiment of the present invention, a pair of sensing units can be configured to have spectral responsivities as illustrated in FIG. 4. In this configuration a first sensing unit has a spectral responsivity 220 which is substantially constant for a first portion and ramps down over a defined wavelength region to substantially zero. A second sensing unit has a spectral responsivity 222 which is substantially similar to that of the first sensing unit, however the ramping down of the spectral responsivity occurs at a greater wavelength. This defined wavelength region can be a part or all of the predetermined wavelength range. In one embodiment the defined wavelength region is the expected spectral radiant power distribution 224 of the light to be sensed. In this configuration of a pair of sensing units, the spectral responsivity of the individual sensing units is substantially wavelength shifted relative to one another.

Figure 5:
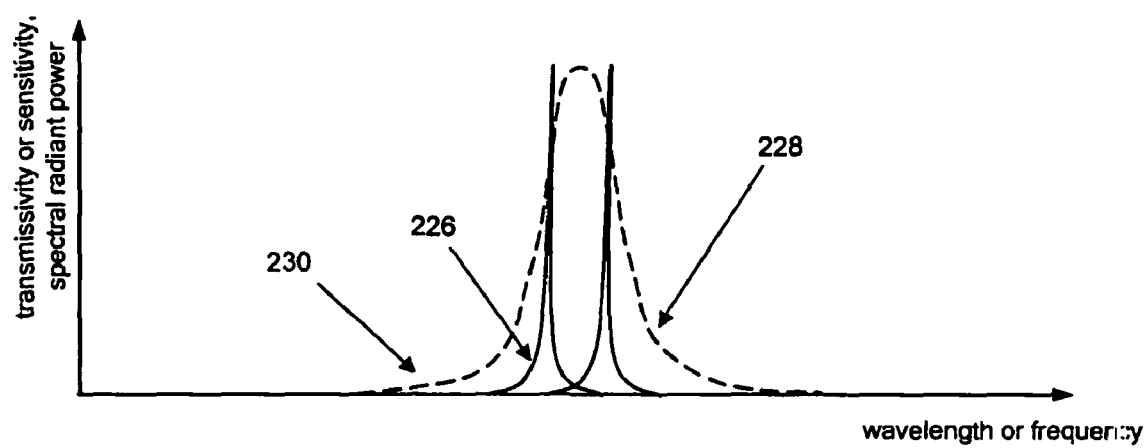
FIG. 5 illustrates responsivity characteristics of a pair of sensing units according to another embodiment of the present invention along with an example spectral radiant power distribution.

In another embodiment of the present invention, a pair of sensing units can be configured to have spectral responsivities as illustrated in FIG. 5. In this configuration a first sensing unit and second sensing unit have substantially narrow spectral responsivities 226 and 228, respectively, which are wavelength shifted relative to one another. In one embodiment, the wavelength shift can be selected to span part or all of the predetermined wavelength range. In one embodiment, the wavelength shift can be selected to span the expected spectral radiant power distribution 230 of the light to be sensed.

Figure 6:
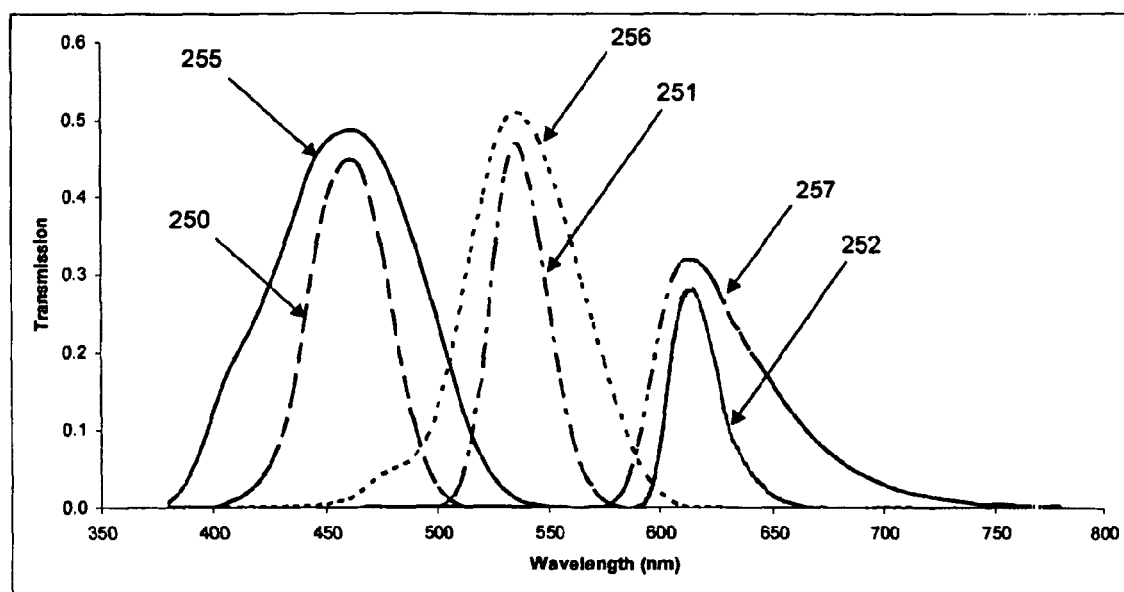
FIG. 6 illustrates example spectral transmissivities of optical filters for use with sensing units according to another embodiment of the present invention.

In another embodiment of the present invention, a pair of sensing units can be configured to have spectral responsivities as illustrated in FIG. 6. In this configuration a first sensing unit is formed from a broadband optical sensor and a first filter manufactured from a specific material and having a first thickness. The second sensing unit is formed from a broadband optical sensor and a second filter manufactured from the same specific material but having a second thickness, wherein the second thickness is greater than the first thickness. In this configuration of a pair of sensing units, the second sensing unit has a narrower spectral responsivity when compared to that of the first sensing unit and therefore this relative configuration of a pair of sensing units can provide a reduction in cross talk therebetween. For example, FIG. 6 illustrates the spectral responsivities of a red filter 252 having a thickness and a red filter 257 having a second thickness which is about four times that of the first thickness. Also illustrated in FIG. 6 are the spectral responsivities of a green filter 251 and a green filter 256 which is about four times thicker, a blue filter 250 and a blue filter 255 which is about four times thicker.

As would be know to a worker skilled in the art, the spectral transmittance of a bulk optical filter can be defined by Beer's law as follows:

$$I(x)=I(0)*\exp(\ln(a(\lambda))*x \qquad (1)$$

where I(x) is the intensity of the light at a distance x from the surface of the filter, I(0) is the intensity of the incident light and $a(\lambda)$ is the wavelength-dependent attenuation constant which is typically experimentally determined.

In another embodiment of the present invention, the wavelength shift of multi-layer interference filters with the angle of incident light can be advantageously used to implement a pair of sensing units. For example, a first sensing unit can comprise an optical sensor and a filter and the second sensing unit can be formed from the same optical sensor and filter, wherein the filter of the second sensing unit is tilted with respect to the filter of the first sensing unit. In this manner the spectral responsivity of the second sensing unit can be wavelength shifted with respect to the spectral responsivity of the first sensing unit.

In an embodiment of the present invention, more than a pair of sensing units are used to evaluate the emission of a light source within a predetermined wavelength range. For example, three sensing units, four sensing units or more sensing units can be used to evaluate the emission of a light source within a predetermined wavelength range The selection of the spectral responsivity of the sensing units relative to one another for the predetermined wavelength range can be determined based on the desired resolution of the evaluation of peak wavelength and intensity of the light emitted by the light source within the predetermined wavelength range. Using three or more sensing units for evaluation of the emission of a light source within a predetermined wavelength range, can improve the accuracy of the evaluation thereof.

In an embodiment wherein more than a pair of sensing units are used to evaluate the emission of a light source within a predetermined wavelength range, the one or more additional sensing units can be used as confirmation sensing units in order to verify that the information collected by one or both sensing units of a pair of sensing unit has a desired level of accuracy.

In an embodiment of the present invention, for implementations in feedback controlled LEE-based luminaires, the spectral responsivity of a pair of sensing units exhibits a higher degree of variation within the wavelength range within which the peak wavelength variations of the one or more light-emitting elements are expected.

For example, each sensing unit when exposed to light under operating conditions provides a signal which is indicative of the convolution of the spectral power distribution of that light and the spectral responsivity of the sensing unit. The measured signal from a sensing unit can be proportional to:

$$s(\tau)=\int \sigma(\lambda-\tau)\Phi(\lambda)d\lambda \qquad (2)$$

where $\sigma$ is the responsivity of a sensing unit per wavelength $\lambda$, $\Phi$ is the spectral power of the sensed light per wavelength (i.e. the spectral power distribution), and $\tau$ is the shift in wavelength which can be incorporated in $\sigma$.

In an embodiment of the present invention, for control purposes a sensing, unit is characterized by strong linear changes to $s(\tau)$ in order to reliably detect changes to the spectral power distribution $\Phi$ of the sensed light. For example, operating temperature changes in LEEs can shift and broaden $\Phi$. The spectral power distribution $\Phi$ of LEE light can be approximated by a Gaussian distribution with a certain peak wavelength $\lambda_0$ and full-width at half maximum (FWHM) wavelength range. The shifting is then reflected in a change of $\lambda_0$ and the FWHM. In one embodiment, wherein the sensing unit is implemented using a combination of a broadband optical sensor and an optical filter with adequate filter characteristics, maximizing the change in response from the sensing unit as a function of changes to the spectral power distribution Φ of the sensed light can be a matter of using a filter with predetermined filter characteristics and shift those filter characteristics as formulated above by changing τ.

In another embodiment of the present invention, wherein a sensing unit is implemented using a narrow band optical sensor. In this configuration an additional optical filter is not needed to achieve the desired spectral responsivity, and such an optical sensor can be configured to provide adequate spectral responsivity primarily by itself in order to be able to reliably indicate changes in the spectral power distribution of sensed light.

Figure 7:
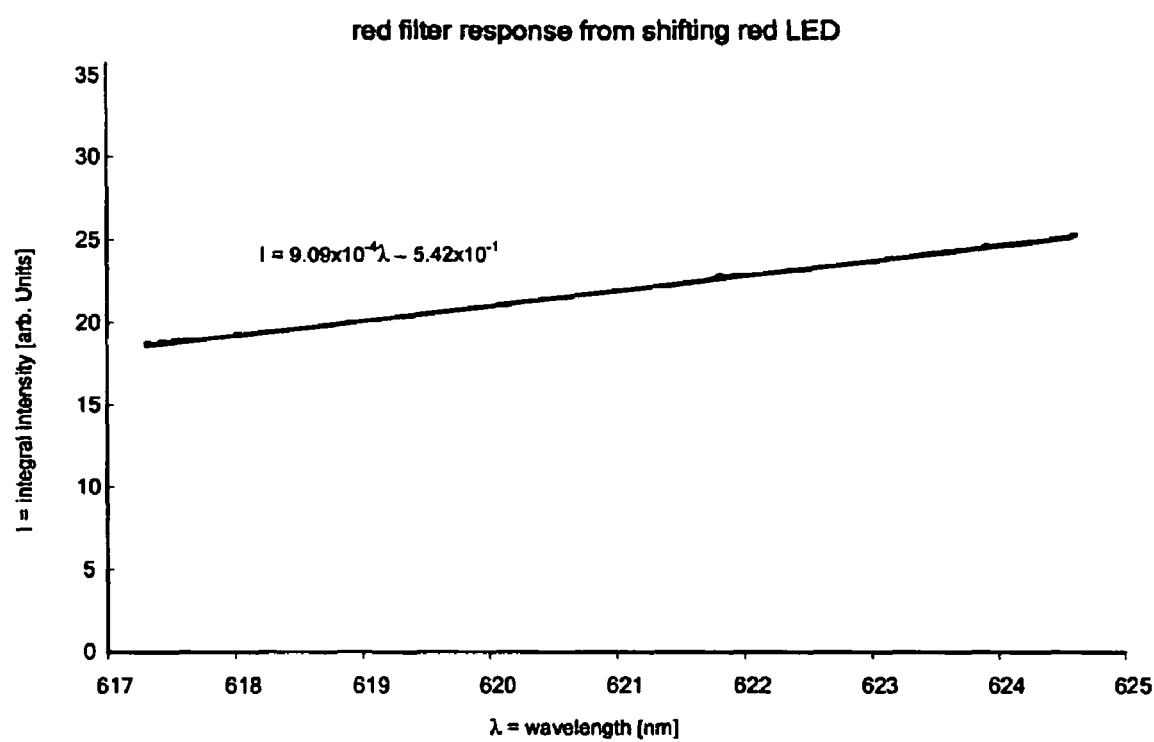
FIG. 7 illustrates a diagrammatic relationship of sensor unit signal versus peak wavelength according to one embodiment of the present invention.
Figure 8:
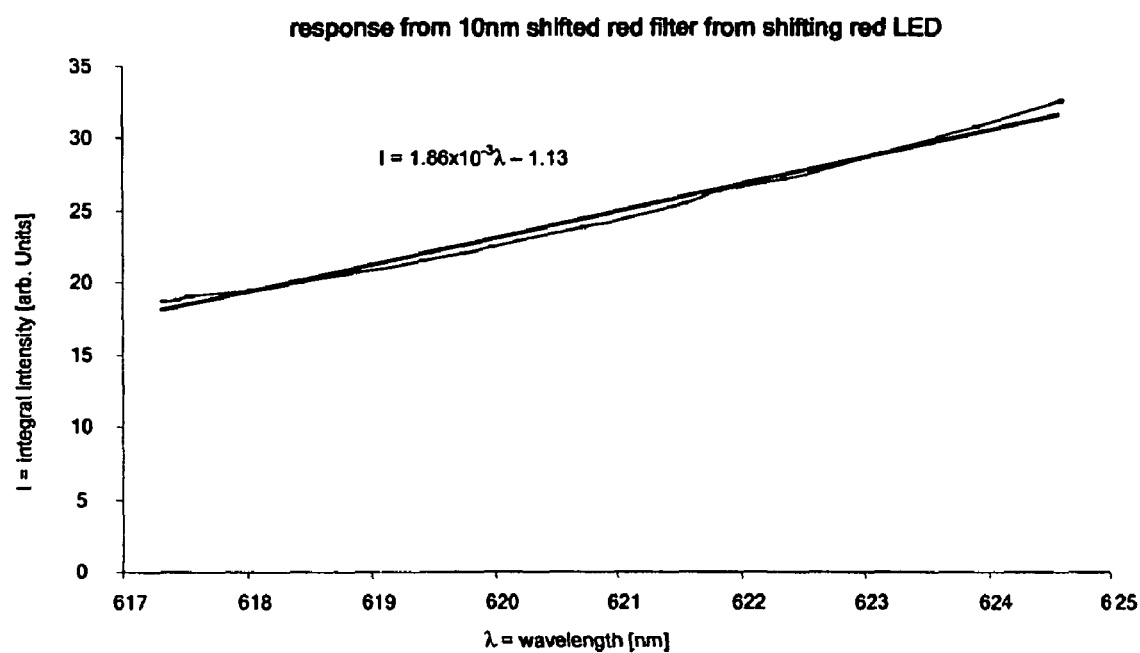
FIG. 8 illustrates a diagrammatic relationship of sensor unit signal versus peak wavelength diagram according to another embodiment of the present invention.

FIG. 7 and FIG. 8 illustrate example diagrams of signal strengths versus peak wavelength of the sensed light which where obtained from two different sensing units according to one embodiment of the present invention. The series of data was obtained using light from red LEDs at different operating temperature conditions. While the signal strengths change predominantly because of shifts to the peak wavelength, changes can also be induced by FWHM or peak amplitude variations of the spectral power distribution of the sensed light. In this embodiment, each sensing unit of a pair comprises a broadband sensor and respectively one of the two red filters whose filter characteristics are illustrated in FIG. 2. As can be seen from FIG. 2 the two sensing units primarily differ in the shifted filter characteristics, wherein the overall shapes of the filters characteristics are substantially similar.

FIG. 7 illustrates the signal strength variation for a sensing unit with optical filter characteristics 210, whereas the one illustrated in FIG. 8 utilizes optical filter characteristics 212. In FIG. 7 the functional relation between signal strength and peak wavelength correlates extremely well with a linear least squares approximation which makes the two almost indistinguishable at the scale at which both are illustrated. The correlation for the configuration which is illustrated in FIG. 8 is just slightly less. As can be easily seen from the linear approximations of the signal output of the sensing unit with a first optical filter as illustrated in FIG. 8 provides an approximately 10% per nm signal change in effect of a peak wavelength shift in contrast to approximately 5% per nm signal change for the one illustrated in FIG. 7.

In an embodiment of the present invention, certain types of LEEs exhibit peak amplitude variations due to operating temperature fluctuations which can be negligible for the above purposes. It is noted that peak amplitude variations due to desired intensity adjustments are of course not negligible.

In an embodiment of the present invention, an optical sensor can be a light-to-current converter comprising a photodiode and a current amplifier and these elements of the optical sensor may be configured for example on a single chip. However, an optical sensor may comprise other similar light detection devices as is known to those skilled in the art, including but not limited to phototransistors, photoresistors, photovoltaic cells, phototubes, photomultiplier tubes or other formats of light-to-voltage converters or light-to-frequency converters. An optical sensor may include lens elements in order to enhance the amount of light that is to which the optical sensor is responsive.

In an embodiment of the present invention a filter is a thin-film interference filter or transmissive dyed colour filter. In addition, a filter employing photonic crystals having resonance abnormalities or a guided-mode resonance filter may also be used. In another embodiment a filter can be configured as a tunable liquid crystal Lyot band pass filter, a single layer of liquid crystal material having a fairly wide bandpass spectral transmittance, a plasmon filter, a Bragg filter, or other types of optical filters as would be readily contemplated by those skilled in the art.

Processing System

The processing system can be implemented in any adequate analog or digital fashion to process the signals from the sensing units. For example the processing system can be configured as a computer, computing system, microcontroller or other format of computing device as would be readily understood by a worker skilled in the art, that is capable of performing a required level of data manipulation and analysis of the collected information relating to light emission from a light source. The processing system includes one or more storage media collectively referred to herein as "memory". The memory can be volatile and non-volatile computer memory such as RAM, PROM, EPROM, and EEPROM, floppy disks, compact disks, optical disks, magnetic tape, or the like, wherein control programs (such as software, microcode, firmware or the like) for defining actions to be performed by the processing system are stored for subsequent access and execution.

By adequately combining and manipulating the output signals from a pair of sensing units, the processing system can determine the intensity and peak wavelength or wavelength shift of the sensed light, within the predetermined wavelength region. The processing system can utilize a division of signal strengths as described in great detail below for a specific class of embodiments of the present invention.

For example, provided that the responsivity of a sensing unit is practically independent of the peak amplitude and the total intensity of the sensed light, and, that furthermore, the FWHM of the sensed light remains practically constant, the ratio of the two signals provides a direct indication of the wavelength shift of the sensed light. For example, in an embodiment of the present invention, one or more function relationships can be determined by expanding the ratio of convoluted integrals as described above, into a series function of first order in the wavelength shift. The peak amplitude or a change in the peak amplitude can subsequently be determined based on the data obtained from the wavelength shift analysis.

In an embodiment of the present invention a pair of sensing units are configured such that their respective spectral responsivities within a predetermined wavelength range are wavelength shifted, for example as illustrated in FIG. 2. When a change in intensity or peak wavelength occurs, the output of both sensing units will change. For example, if the output of a first sensing unit of the pair is substantially flat and the output of the a second sensing unit of a pair is substantially "sharp" for example peaked, the difference between the output of the first sensing unit and the second sensing unit can be attributed to wavelength changes, thereby enabling the determination of (one or more functional relationships between the output signals from each of the sensing units of the pair and the intensity and peak wavelength of the emitted light to be determined.

In an embodiment of the present invention a pair of sensing units are configured such that their respective spectral responsivities are as illustrated in FIG. 3. In this configuration, if the intensity of the sensed light within the predetermined wavelength range increases without a change in peak wavelength or spectral broadening, the ratio of the output signals between the pair of sensing units will remain substantially unchanged, thereby enabling intensity of the light to be measured directly. If however, the peak wavelength shifts or there is spectral broadening of the emitted light, the ratio of the output signals will typically change. Based on one or more predetermined correlations or functional relationships between the output signals from each of the sensing units of the pair, the intensity and peak wavelength of the light within the predetermined wavelength range can be evaluated.

In an embodiment of the present invention a pair of sensing units are configured such that their respective spectral responsivities are as illustrated in FIG. 4. In this configuration, the output of the sensing unit having a substantially flat portion substantially over the substantially over the spectral power distribution of the emitted light, as illustrated by 222, can provide an intensity measurement for the emitted light. In addition the output of the sensing unit having a sloping spectral responsivity substantially over the spectral power distribution of the emitted light, as illustrated by 220, when scaled by the output of the substantially flat sensing unit, can provide a means for evaluating peak wavelength shift and spectral broadening. This can therefore provide for the generation of one or more functional relationships defining a correlation between the output signals of one or more pairs of sensing units and the intensity and peak wavelength of the emitted light.

In an embodiment of the present invention a pair of sensing units are configured such that their respective spectral responsivities are as illustrated in FIG. 5. In this embodiment of the present invention, one or more functional relationships between the output signals from a pair of sensing units and the intensity and peak wavelength of the emitted light, can be partially based on an assumed spectral power distribution of the light source. For example the spectral power distribution of an LED can be approximated by a Gaussian distribution or a linear combination of two Gaussian functions with different centre wavelengths.

In an embodiment of the present invention, the analysis of the output signals of each of a pair of sensing units can be performed using one or more analytic algorithms or one or more numerical algorithms or one or more of both, which define the sequence of calculations being performed by the processing system in order to evaluate the intensity and peak wavelength of the emitted light. These one or more algorithms can be stored in memory for subsequent use by the processing system.

In an embodiment of the present invention, the processing system comprises a neural network. In this embodiment, a neural network can be used as a universal approximator capable of representing any continuously differentiable bounded function. In addition, a neural network as described by for example Haykin, S., Neural Networks: A Comprehensive Foundation, Second Edition, Prentice Hall, 1999 and U.S. patent application Ser. No. 10/897,990, can represent a non-linear multivariate function with a minimum of computing resources. The neural network can be a radial basis function (RBF), a generalised radial basis function (GRBF), or other format of a neural network, as would be readily understood by a worker skilled in the art. The neural network represents a multidimensional function and can provide output signals relating to intensity and peak wavelength of the emitted light. It may not be necessary or even desirable to have an analytic expression for the evaluation function, since a neural network can be trained to learn the function based on example input data and known or desired output data. The network can therefore be trained on the "factory floor" using a predetermined set of inputs, for example, signal outputs from a pair of sensing units together the desired responses which represent intensity and peak wavelength which are to be determined.

In an embodiment of the present invention, the neural network is a radial basis function (RBF) network which is a feed-forward architecture with an input layer, one hidden layer, and an output layer. The input layer has n neurons, corresponding to the n elements of the input vector x. The hidden layer has h neurons and one bias neuron, with each input neuron fully connected to the h hidden layer neurons. Each hidden layer neuron (including the bias neuron) is connected to the m output neurons. Each output layer neuron represents one of m possible outputs for the input vector. In operation, an arbitrary input vector x is presented to the RBF network. Each hidden layer neuron computes its output, and the results are presented to the output layer. Each output layer neuron performs a weighted summation of the hidden layer neuron outputs. The input vector x is thereby mapped to the output vector z. The number of hidden neurons can vary depending on the complexity of the multidimensional function to be approximated. For the above description, a neuron is a simplified computational model of a biological neuron, which can be thought of as a non-linear amplifier, typically with a gain of unity or less.

As would be known to a worker skilled in the art, the training of a radial basis function neural network comprises determining the centres and widths of the hidden layer neuron activation functions, and determining the weights needed for the output layer neurons. There are numerous training strategies, ranging from selecting hidden neuron centres at random from a training set of input vectors as defined by Lowe, D., Adaptive Radial Basis Function Nonlinearities and the Problem of Generalization, First IEEE International Conference on Artificial Networks, 1989, to applying regularization theory as defined by Leonardis, A., and Bishchof, A., An Efficient MDL-Based Construction of RBF Networks, Neural Networks, 1998.

Figure 9:
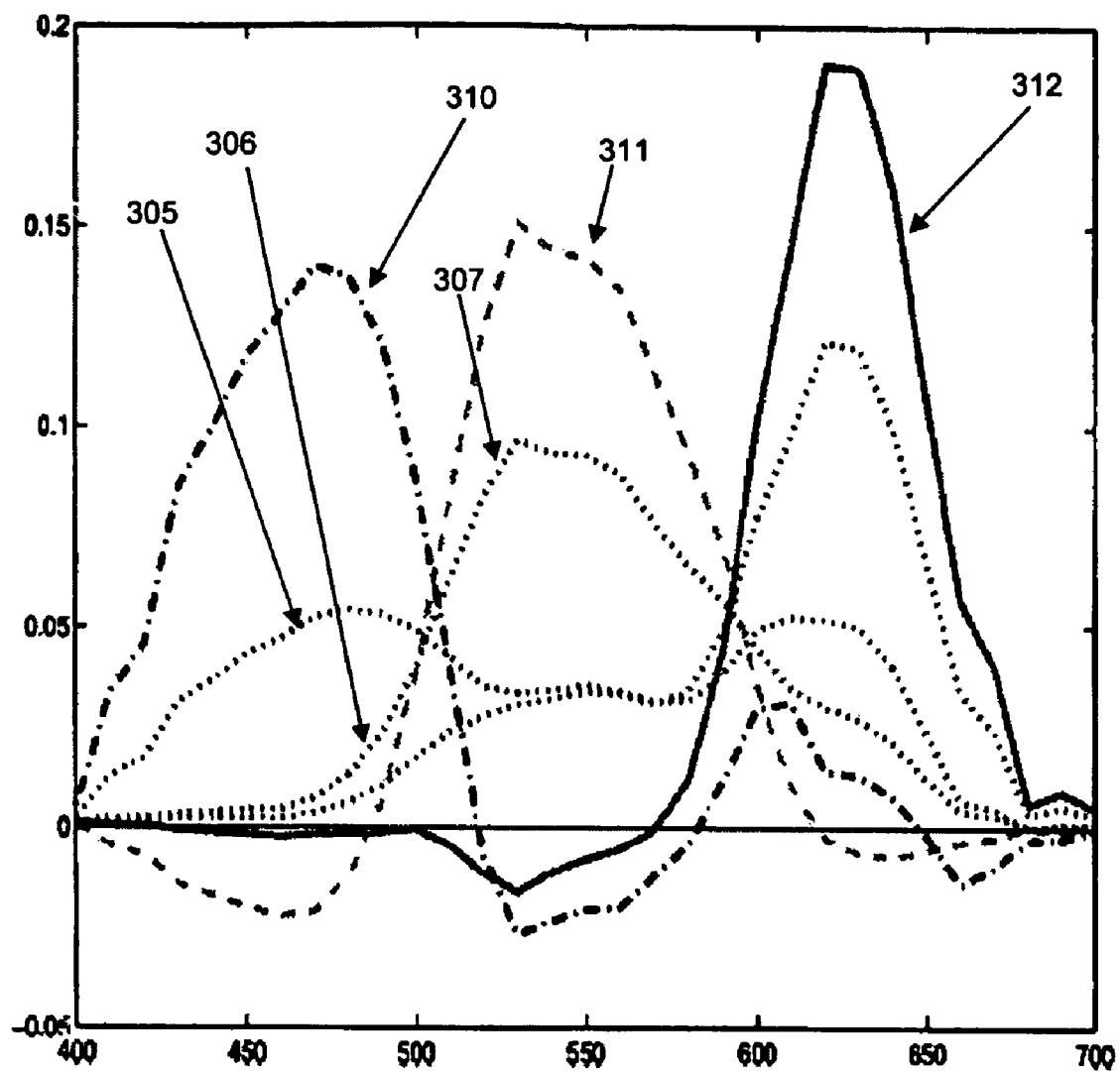
FIG. 9 illustrates detected spectral responsivities and analytically sharpened spectral responsivities of emitted light in the red green and blue wavelength regions.

In an embodiment of the present invention, the spectral responsivities of the sensing units are analytically sharpened. In this embodiment, given a measured set of m pairs of sensing units with different spectral responsivities, namely measured spectral responsivities, $S_M$, each spectral responsivity may be considered to be a linear combination of a virtual or sharpened set of m pairs of sensing unit with different spectral responsivities, namely virtual spectral responsivities, $S_V$. These virtual spectral responsivities may be chosen such that the bandwidth of each spectral responsivity is generally narrower than its corresponding real or measured spectral responsivity. FIG. 9, which is taken from Drew, M. S., and G. D. Finlayson. 2000. "Spectral Sharpening with Positivity," Journal of the Optical Society of America A, 17(8):1361-1370, illustrates an example of spectral sharpening, wherein m=3 and illustrates the measured spectral responsivities $S_M$ 305, 306 and 307 and respective virtual spectral responsivities $S_V$ 310, 311 and 312 which are analytically sharpened.

For example, as defined by Drew, M. S., and G. D. Finlayson. 1994. "Device-Independent Color via Spectral Sharpening," Proc. Second Color Imaging Conference: Color, Science, Systems and Applications, IS&T/SID, pp. 121-126, the sharpened spectral responsivities are generated by a m×m transformation matrix wherein the virtual or sharpened spectral responsivities can be defined as follows:

$$x^{\#}(\lambda) = T^X x(\lambda) \quad\quad\quad (3)$$

wherein for example:

$$T^x = \begin{bmatrix} 0.50713 & -0.17050 & -0.08209 \\ -0.37580 & 0.55150 & 0.04542 \\ 0.02809 & -0.03359 & 0.26364 \end{bmatrix}$$

and wherein $x(\lambda)$ and $x^\#(\lambda)$ are the measured and virtual or sharpened spectral responsivities for wavelength $\lambda$, respectively.

As would be known to a worker skilled in the art, the values of the sharpening transform $T^X$ will depend on the choice of the virtual spectral responsivities. In an embodiment of the present invention, the values of the sharpening transform can be determined in order that the measured and virtual or sharpened spectral responsivities of the sensing units produce different outputs when illuminated by narrow bandwidth light sources such as colour LEEs. For example, the difference between the measured spectral responsivity and the virtual or sharpened spectral responsivity of the sensing units can be maximized in the sense that changes in intensities and peak wavelengths of the colour LEEs can be simultaneously determined with minimum signal-to-noise ratio.

In an embodiment of the present invention, a pair of sensing units are configured in a manner wherein a first sensing unit collects information relating to the light emitted by the light source in a first predetermined wavelength range and the second sensing unit of a pair collects information relating to the light emitted by the light source in a second predetermined wavelength range that overlaps the first predetermined wavelength range. The spectral responsivities of the first sensing unit and second sensing unit are then analytically sharpened as defined above and as described in Drew, M. S., and G. D. Finlayson. 2000. "Spectral Sharpening with Positivity," Journal of the Optical Society of America A, 17(8):1361-1370 to effect a first virtual so sensing unit and a second virtual sensing unit respectively. Through the correlation of the outputs of the first sensing unit, the first virtual sensing unit, the second sensing unit and the second virtual sensing unit, the intensity and peak wavelength of the light within the predetermined wavelength range can be determined.

Temperature Compensation

In an embodiment of the present invention, compensation for operating temperature induced changes to the responsivity characteristics of a sensing unit is required. Possible solutions to stabilize the operating temperature of a sensing unit include combinations of insulating the sensing unit from direct thermal contact, keeping the amount of radiation exposure limited and active or passive cooling or heating. Respective implementations of such measures are widely known in the art.

In another embodiment of the present invention, the processing system can be configured to account for temperature induced changes in sensing unit spectral responsivity. In this embodiment, a temperature sensor proximate to the sensing unit can be provided in order to enable collect data relating to the operating temperature of the sensing units and thereby evaluate and determine if the spectral responsivity of one or more of the sensing units has changed due to temperature.

Optional Filter Means

In one embodiment of the present invention, significant responsivity to light outside a predetermined wavelength range which is of interest, can cause a sensing unit to provide signals that can cause inaccuracies in the peak wavelength and intensity analysis. This can occur, for example, when using sensing units with spectral responsivities as illustrated in FIGS. 3 and 4. With reference to the embodiments of sensor units as illustrated in FIGS. 3 and 4, in such cases any light that may significantly vary in spectral composition outside the ramped wavelength range or frequency responsivity characteristics region can unpredictably affect the signal provided by the sensing unit and may cause the processing system to provide erroneous results relating to intensity and peak wavelength shifts.

In one embodiment of the present invention, a sensing unit can be combined with additional filters that cut off light with interfering wavelengths, namely wavelengths that are outside of the predetermined wavelength range for the sensing unit.

In one embodiment, this can be particularly relevant in luminaires with photo-luminescent type LEEs, for example, UV LEDs, or blue LEDs that utilize phosphors or other materials for visible light conversion. Such LEEs can emit significant amounts of residual ultraviolet light which need not be sensed by a sensing unit, for example for when feedback control of the visible light emitted by the luminaire is desired. Similarly infrared radiation can cause inadequate sensor readings and may need to be filtered.

In another embodiment of the present invention, a sensing unit with a spectral responsivity substantially within the predetermined wavelength range can provide better wavelength or frequency resolution.

It is noted that while narrow spectral responsivity characteristics can be achieved, for example, with combinations of narrow band filters and broad band sensors, in one embodiment of the present invention, it may be advantageous to implement a sensing unit as a narrow band optical sensor. As is widely known, most narrow band filters exhibit significant variations in filter characteristics when changing, for example, the angle of inclination. For example, a few degrees variation in the inclination of light can cause the filter characteristics of multi-layer interference filters to not only significantly broaden but even shift in wavelength.

The invention will now be described with reference to specific examples. It will be understood that the following examples are intended to describe embodiments of the invention and are not intended to limit the invention in any way.

Example

Figure 10:
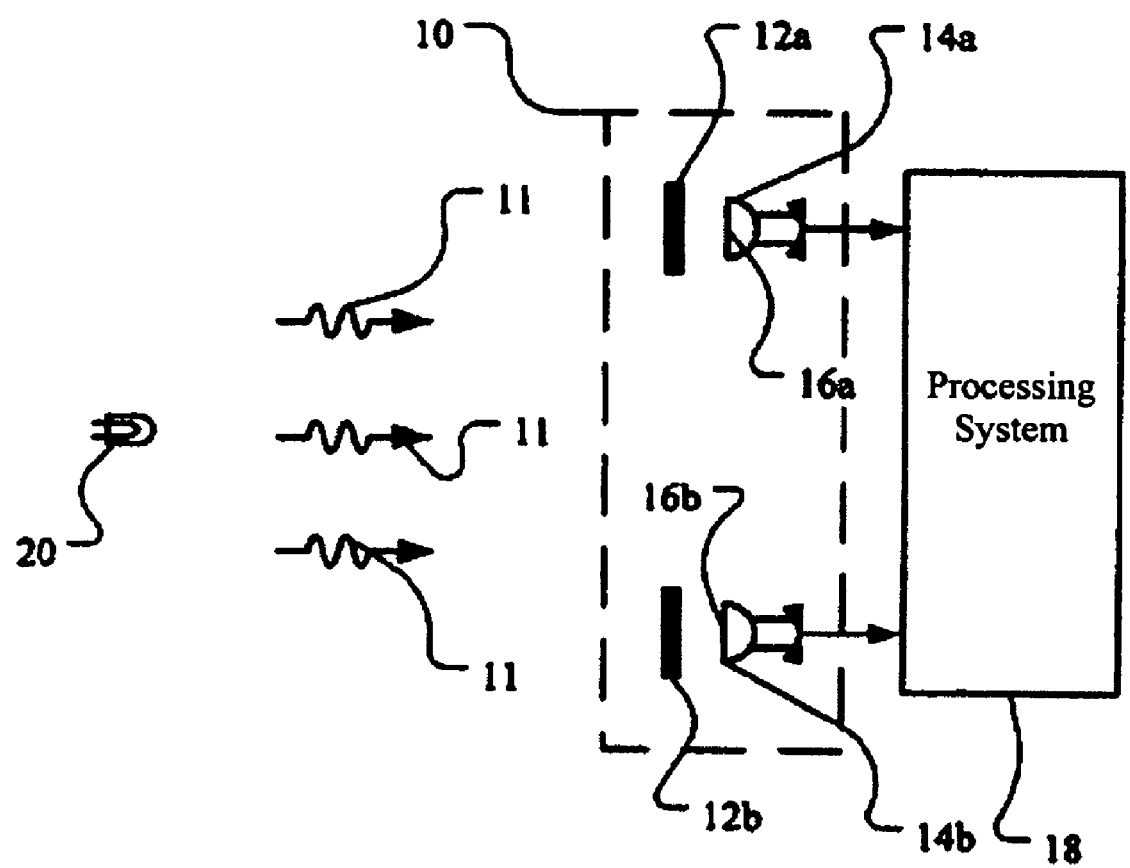
FIG. 10 illustrates a diagrammatic view of an apparatus according to one embodiment of the present invention.

FIG. 10 illustrates an apparatus according to an embodiment of the present invention. The apparatus 10 includes colour filters 12a, 12b optically coupled to photodetectors 14a, 14b which together form two sensing units. Each photodetector has a detection zone 16a, 16b for determining a sensor parameter indicative of incident light 11. The outputs of photodetectors 14a, 14b are interfaced to a processing system 18 which evaluates the data received from each of the photodetectors 14a, 14b.

The colour filters 12a, 12b may be thin-film interference filters or transmissive coloured dye filters, allowing passage of a specific portion of the electromagnetic spectrum. Filters employing photonic crystals having resonance abnormalities or guided-mode resonance filters may also be used. Alternatively, tunable liquid crystal Lyot band pass filters, a single layer of liquid crystal material having a fairly wide bandpass, plasmon filters or other types of optical filters as contemplated by those skilled in the art may also be employed.

The photodetectors 14a, 14b can be light-to-current converters comprising a photodiode and a current amplifier and these elements of the photodetectors may be configured for example on a single chip. However, the photodetectors 14a, 14*b* may comprise other similar light detection devices as known to those skilled in the art, including light-to-voltage converters and light-to-frequency converters. The photodetectors 14*a*, 14*b* may include lens elements (not shown) within the optical path in front of the detection zones 16*a*, 16*b* in order to enhance the amount of light that is provided to the detection zones 16*a*, 16*b*.

The first sensing unit formed from filter 12*a* and photodetector 14*a* of a pair and the second sensing unit formed from filter 12*b* and photodetector 14*b* of the pair are typically mounted on a common substrate. Since the efficiency of the photodetectors 14*a*, 14*b* is dependent upon the operating temperature of the photodetectors 14*a*, 14*b*, both photodetectors 14*a*, 14*b* can be mounted on an isothermal region of the common substrate. Accordingly, while the absolute spectral responsitivities of the photodetectors 14*a*, 14*b* may change with ambient temperature, their relative spectral responsivities can remain effectively unchanged.

As previously mentioned, in the presently described embodiment of the invention, the colour filters 12*a*, 12*b* are optically coupled to photodetectors 14*a*, 14*b*. Advantageously, the filter 12*a* and photodetector 14*a* of the first sensing unit of the pair is sufficiently spaced from the filter 12*b* and photodetector 14*b* of the second sensing unit of the pair to reduce cross-talk among them. In another embodiment, the colour filters 12*a*, 12*b* could be in spaced relationship with the photodetectors 14*a*, 14*b*. The colour filters 12*a*, 12*b* and photodetectors 14*a*, 14*b* can be configured and arranged along an axis that is perpendicular or at an angle with respect to the axis of the incident light 11.

Figure 11:
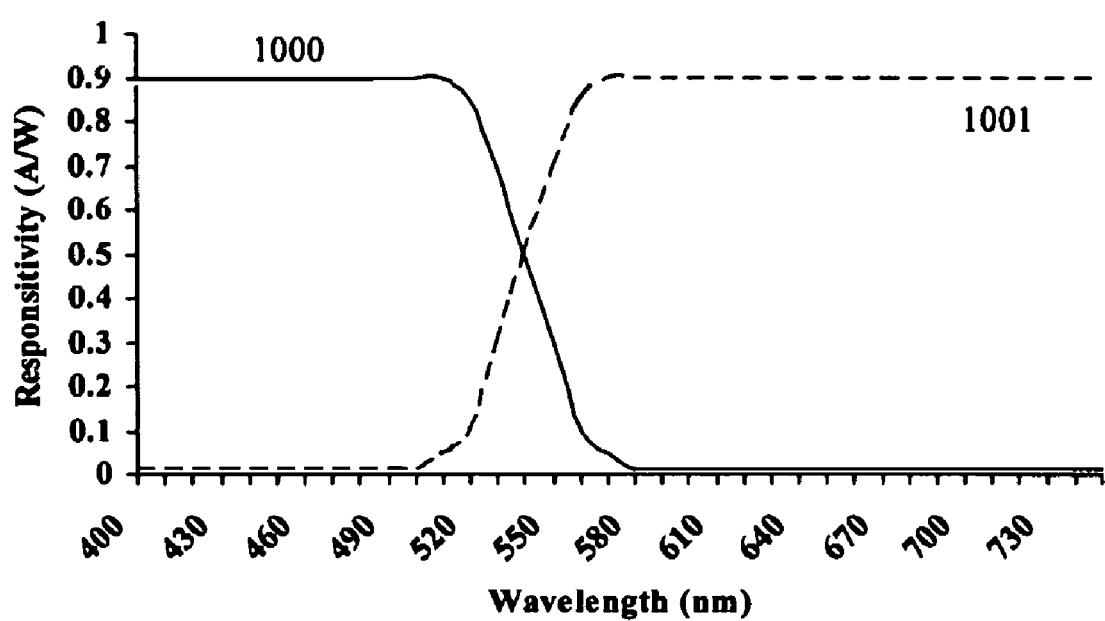
FIG. 11 illustrates a diagram with the transmissivities of a pair of sensing units according one embodiment of the present invention.

In the presently described embodiment, filter 12*a* and photodetector 14*a* forming the first sensing unit of the pair are configured and arranged so as to be sensitive to a predetermined region of the electromagnetic spectrum 1001, while filter 12*b* and photodetector 14*b* forming the second sensing unit of the pair are configured and arranged to be sensitive to a substantially complementary wavelength region of the electromagnetic spectrum, 1000, as illustrated in FIG. 11. The spectral responsivities of the first sensing unit and the second unit overlap in a predetermined wavelength range of the electromagnetic spectrum, which for this example is the green light region, and therefore this configuration of a pair of sensing units can be used to evaluate the intensity and peak wavelength of the light emitted within this predetermined wavelength range. Furthermore, the spectral responsivity of the first sensing unit substantially monotonically increases with respect to wavelength within the predetermined wavelength range, while the spectral responsivity of the second sensing unit substantially monotonically decreases with respect to wavelength within the predetermined wavelength range.

In an embodiment of the present invention, and wherein the sensing units are configured substantially as illustrated in FIG. 3, if the incident light 11 has a relative spectral power distribution $I(\lambda)$ and the spectral responsivities of the first sensing unit (filter 12*a* and photodetector 14*a*) and second sensing unit (filter 12*b* and photodetector 14*b*) are respectively $R_a(\lambda)$ and $R_b(\lambda)$, the outputs of the sensing units of the pair are respectively $V_a = \int_\lambda I(\lambda) R_a(\lambda) d\lambda$ and $V_b = \int_\lambda I(\lambda) R_b(\lambda) d\lambda$. If the intensity I of the incident light 11 is varied while the relative spectral power distribution $I(\lambda)$ remains constant, the respective output of the pair of sensing units and the quotient $V_a/V_b$ thereof also remain substantially constant. If, on the other hand, the relative spectral power distribution $I(\lambda)$ of the incident light 11 varies, the respective outputs of the pair of sensing units and the quotient thereof will also vary. If the change in the relative spectral power distribution $I(\lambda)$ is characterized by a shift in peak wavelength, simultaneous changes in intensity I and the relative spectral power distribution $I(\lambda)$ can be mathematically separable, and therefore determinable.

With further reference to FIG. 11 which illustrates the spectral responsivity 1001 of the first sensing unit (filter 12*a* and photodetector 14*a*) of the pair compared to the spectral responsivity 1000 of the second sensing unit (filter 12*b* and photodetector 14*b*) of the pair according to an embodiment of the present invention, wherein the responsivities of the pair of sensing units overlap in a predetermined wavelength range. In an embodiment of the present invention, if the peak wavelength of the relative spectral power distribution increases, the output of the first sensing unit of the pair will increase, while the output of the second sensing unit of the pair will decrease. As an example, if wavelength $\lambda$ of incident light 11 from a monochromatic light source is increased, the output of first sensing unit will decrease while the output of second sensing unit will increase. Conversely, if wavelength $\lambda$ of incident light 11 is decreased, the output of first sensing unit will increase while the output of second sensing unit will decrease. For example, assuming that wavelength $\lambda$ remains within the predetermined wavelength range of the spectrum, the wavelength will be proportional to $B+(1-A)/(A+B)$, relative to the minimum wavelength $\lambda_{min}$ of said predetermined wavelength range of the spectrum. Similarly, for example the wavelength can be proportional to quotient A/B, although in a typically less linear manner.

For example, when a pair of sensing units are configured as illustrated in FIG. 3, if the intensity of the incident light varies but the peak wavelength and relative spectral power distribution remains unchanged, the output signals of the two sensing units also changes but the quotient of their output signals remains constant if the characteristics of the sensing units are adequately chosen. Typically, the intensity of the incident light does not affect the accuracy of the output of the pair of sensing units. If, on the other hand, the peak wavelength or the relative spectral power distribution of the incident light varies, the output signals of the pair of sensing units and the quotient thereof can be used to calibrate and determine the intensity and peak wavelength of light, for example, from a LEE-based luminaire.

The output signal of each of the pair of sensing units is measured by processing system 18, which can comprise a current meter combined with additional circuitry for conditioning of the signal from the current meter, as would be know to a worker skilled in the art. The processing system 18 receives the respective output signals of the pair of sensing units and is further configured with software, firmware of the like to evaluate one or more relationships between these output signals. This evaluation of the output signals of the pair of sensing units provides a means for the evaluation of the intensity and the peak wavelength of the light within the predetermined wavelength range.

For applications using for example substantially high-frequency pulse width or pulse code modulation for controlling the activation of the light-emitting elements, the intensity of the incident light can vary rapidly, and therefore it may be necessary to measure the output of the pair of sensing units simultaneously with the activation of the light-emitting elements in order to avoid discrepancies in the measured output due to the time-variations of incident light. Accordingly, the processing system 18 can comprise additional circuitry (not shown) such as parallel flash analog-to-digital converters or sample-and-hold circuitry to simultaneously measure the output of the pair of sensing units with the activation of the light-emitting elements.

In an embodiment of the present invention, in operation the physical elements employed to implement a pair of sensing units, for example, filters 12a, 12b and photodetectors 14a, 14b, may not exhibit perfect or near perfect behaviour. It therefore may be difficult to obtain constant slope attenuation with respect to wavelength for physically realizable spectral responsivities as illustrated in FIG. 11. As a result, the relationship between the intensity and peak wavelength of incident light 11 and the outputs of the pair of sensing units may become nonlinear. In order to account for these possible nonlinearities associated with the physically realizable components for the pair of sensing units, in an embodiment of the present invention the outputs of the pair of sensing units can be compared with a lookup table containing optimal values and these outputs can be re-evaluated by analytic approximations in an attempt to linearize the spectral responsivities for the pair of sensing units.

Figure 12:
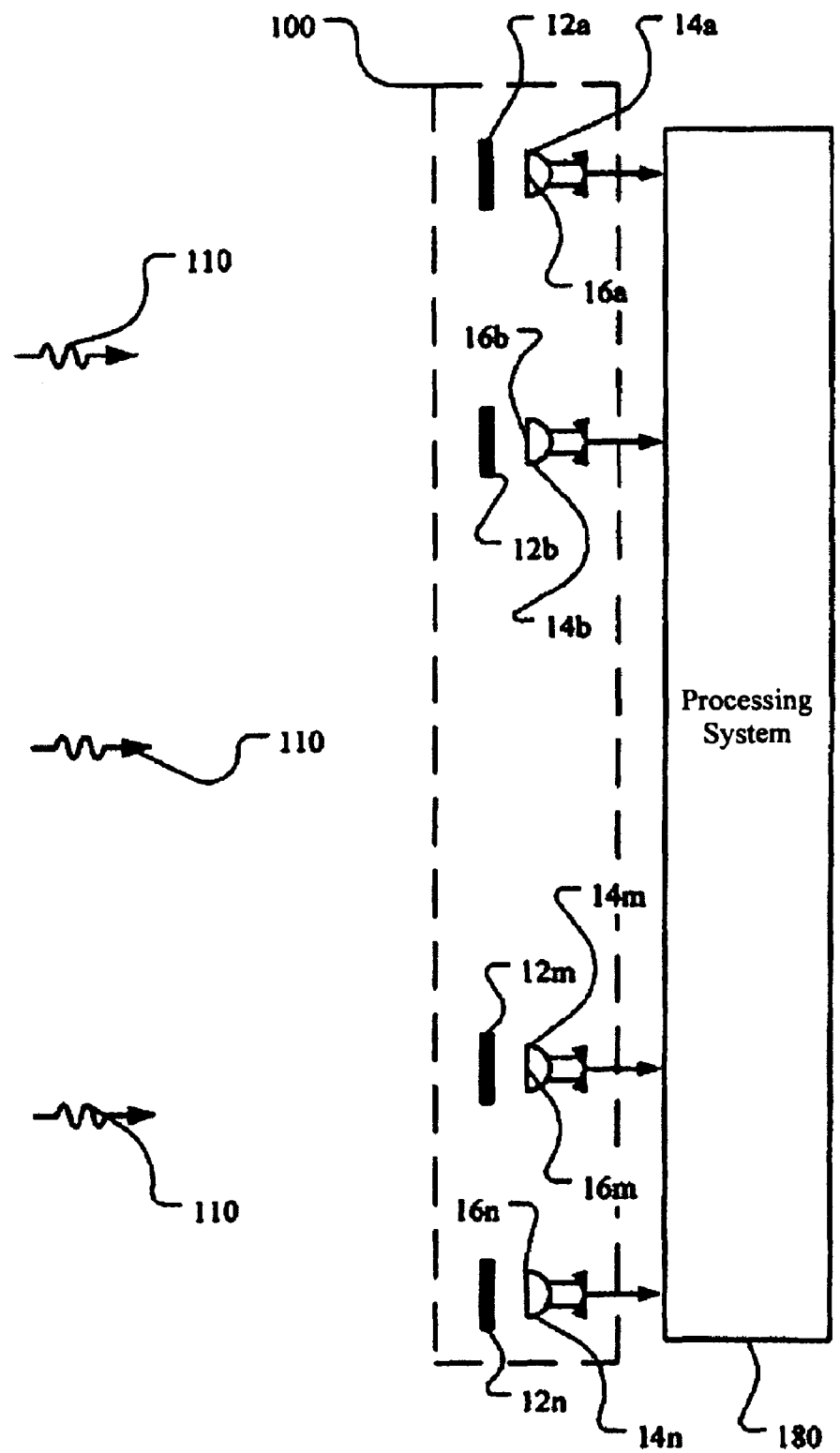
FIG. 12 illustrates a diagrammatic view of an apparatus according to another embodiment of the present invention.

Referring to FIG. 12, an apparatus in accordance with another embodiment of the present invention is illustrated. The apparatus 100 includes a plurality of colour filters 12a . . . 12n optically coupled to photodetectors 14a . . . 14n, respectively, thereby forming n sensing units which form n/2 pairs of sensing units. Each sensing unit has a detection zone 16a . . . 16n associated therewith for determining a sensor parameter in relation to the intensity and peak wavelength of incident light 110. This incident light 110 has a gamut that is the combination of light of various wavelengths generated by the light-emitting elements (not shown), whereby each light-emitting element produces light having a specific range of wavelengths in the electromagnetic spectrum. In the diagrammatic representation of apparatus 100 in FIG. 12, only the colour filters 12a, 12b, 12m and 12n, and photodetectors 14a, 14b, 14m and 14n, are shown.

The filter 12a and photodetector 14a form a first sensing unit which is complementary to the second sensing unit formed from filter 12b and photodetector 14b. In a similar fashion, the filter 12m and photodetector 14m form a mth sensing unit which is complementary with nth sensing unit formed from filter 12n and photodetector 14n. Each sensing unit of a pair is configured and arranged so as to be sensitive to a predetermined region of the electromagnetic spectrum, while the corresponding complementary filter and photodetector of the pair is configured and arranged to be sensitive to a substantially complementary region of the electromagnetic spectrum, wherein the spectral responsivities of a pair of sensing units are complementary within the predetermined wavelength range. The spectral responsivities of the mth sensing unit and of its complementary sensing unit can overlap in another predetermined wavelength range of the electromagnetic spectrum. Moreover, the spectral responsivity of the mth sensing unit substantially monotonically increases with respect to wavelength within said predetermined wavelength range, while the spectral responsivity of its complementary sensing unit substantially monotonically decreases with respect to wavelength within said predetermined wavelength range.

In an embodiment of the present invention, the outputs of photodetectors 14a . . . 14n are interfaced to a processing system 180 which can independently evaluate the sensor parameters from the photodetectors 14a . . . 14n. The quotient of the output of the mth sensing unit of the pair divided by the output of the complementary nth sensing unit of the pair can be proportional to the peak wavelength. This quotient can be determined by the processing system 180 and can serve to resolve the intensity of the incident light 110.

Figure 13:
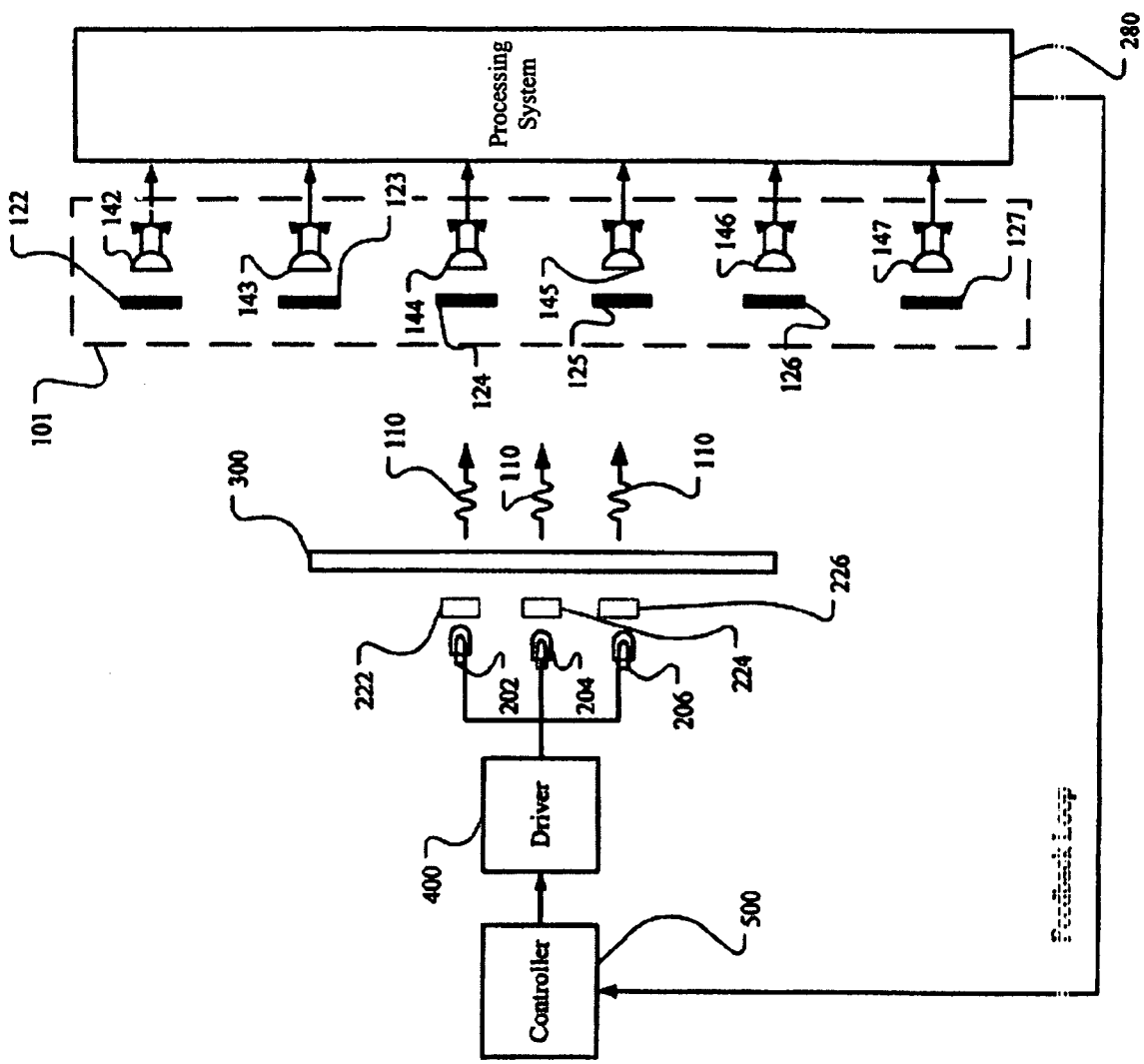
FIG. 13 illustrates a diagrammatic view of an implementation of one embodiment of the present invention in a luminaire.

Reference is now made to FIG. 13, which shows an illumination system according to an embodiment of the present invention. The illumination system includes a plurality of light-emitting elements 202, 204 and 206 emitting electromagnetic radiation with different peak wavelengths. In the presently described embodiment of the invention, the light-emitting elements are LEDs, however other types of light-emitting elements as is known to those skilled in the art can also be used. The light-emitting elements 202, 204 and 206 are configured and arranged in a red array, a green array, and a blue array, respectively.

In an embodiment a condenser lens 222 or the like can be provided to entrance the optical output of the red array 202, for example. Like condenser lenses 224 and 226 or alternate optical elements can be provided for the blue and green arrays of light-emitting elements.

The light emitted from the red, green, and blue arrays, which can be emitted either sequentially or simultaneously, can provide a steady optical throughput of white light 110 composed of the combination of the red, green and blue light colours. In an embodiment, an optical diffuser 300 is provided to further spatially blend the constituent red, green and blue light colours, thereby improving the uniformity of the colour mixing and thereby generating white light 110 of a substantially uniform chromaticity.

With further reference to FIG. 13, the filter 122 and photodetector 142 which form a first sensing unit, form a complementary pair with the second sensing unit of the pair formed from filter 123 and photodetector 143. In a similar fashion, third filter 124 and photodetector 144 which form a third sensing unit form a complementary pair with the fourth sensing unit formed from filter 125 and photodetector 145, and the fifth filter 126 and photodetector 146 form a fifth sensing unit form a complementary pair with the sixth sensing unit formed from filter 127 and photodetector 147. Each of the filters 122, 124 and 126, and photodetectors 142, 144 and 146, respectively, is configured and arranged so as to be sensitive to a predetermined region of the electromagnetic spectrum, while their corresponding complementary filters 123, 125 and 127, and photodetectors 143, 145 and 147, are configured and arranged to be sensitive to a respectively substantially complementary region of the electromagnetic spectrum. As a result, the spectral responsivities of filters 122, 124 and 126, and photodetectors 142, 144 and 146 and their respective complementary filter 123, 125 and 127, and photodetector 143, 145 and 147 pairs overlap in a multiplicity of predetermined wavelength ranges of the electromagnetic spectrum, for example the red wavelength range, blue wavelength range and green wavelength range. In addition, the spectral responsivity of filters 122, 124 and 126, and photodetectors 142, 144 and 146 substantially monotonically increases with respect to wavelength within each said predetermined wavelength range, while the spectral responsivity of their respective complementary filter 123, 125 and 127, and photodetector 143, 145 and 147 substantially monotonically decreases with respect to wavelength within each said predetermined wavelength range, and wherein each said predetermined wavelength range includes the expected variation in peak wavelength of light-emitting elements 202, 204 and 206 respectively.

In an embodiment of the present invention, the outputs of photodetectors 142 to 147 are interfaced to the processing system 280 independently measures the output signals from the photodetectors 142 to 147. The quotient of the output signals of filters 122, 124 and 126, and photodetectors 142, 144 and 146 divided by the output of their respective corresponding filter 123, 125 and 127, and photodetector 143, 145 and 147 can be proportional to the peak wavelength of the red, green and blue lights, respectively. Each quotient can be evaluated by the processing system 280 and can serve to resolve the intensity of the incident light 110. The processing system can be further configured in order to evaluate the peak wavelength of the light emitted in each of the predetermined wavelength ranges.

In an embodiment of the present invention, a driver circuit 400 module coupled to the light-emitting elements 202, 204 and 206 can be configured to generate a drive signal for independently or interdependently driving the light-emitting elements 202, 204 and 206. A controller 500 can communicate with the driver circuit 400. The controller 500 can be implemented by a microprocessor or the like and can control the amount of current supplied to each light-emitting elements 202, 204 and 206. In an embodiment of the present invention the control of the current supplied to the light-emitting elements can be performed using pulse width modulation, pulse code modulation or other method as would be readily understood by a worker skilled in the art.

The controller 500 can interface with the processing system 280 in a feedback loop configuration. The feedback loop configuration can allow the controller 500 to constantly monitor the intensity and chromaticity of the incident light 110 based on the parameters determined by the processing system 280, and determine the amount of current to be supplied to each of the light-emitting elements 202, 204 and 206 in order to maintain constant intensity and chromaticity of the generated incident light 110.

In another embodiment of the present invention, the processing system 280 and the controller 500 can be integrated within the same computing device.

It is obvious that the foregoing embodiments of the invention are exemplary and can be varied in many ways. Such present or future variations are not to be regarded as a departure from the spirit and scope of the invention, and all such modifications as would be obvious to one skilled in the art are intended to be included within the scope of the following claims.

The disclosure of all patents, publications, including published patent applications, and database entries referenced in this specification are specifically incorporated by reference in their entirety to the same extent as if each such individual patent, publication, and database entry were specifically and individually indicated to be incorporated by reference.

We claim:

1. An apparatus for determining intensities and peak wavelengths in one or more predetermined wavelength ranges of light, the apparatus comprising:
    a) one or more pairs of sensing units for sensing the light, a first sensing unit of a pair configured to sense a first intensity of the light in a first predetermined wavelength range with a first predetermined spectral responsivity and a second sensing unit of a pair configured to sense a second intensity of the light in the first predetermined wavelength range with a second predetermined spectral responsivity; and
    b) a processing system operatively connected to the one or more pairs of sensing units, the processing system configured to determine the intensity and peak wavelength for each of the one or more predetermined wavelength ranges of the light according to one or more predetermined functional relationships between each of the first intensity and second intensity, wherein the first predetermined spectral responsivity is substantially constant for a first portion and ramps down over the predetermined wavelength range and the second predetermined spectral responsivity ramps up over the predetermined wavelength range to a substantially constant level.

2. The apparatus according to claim 1, wherein one or more of the sensing units include a broadband optical sensor and a filter configured to define a predetermined wavelength range for the sensing unit.

3. The apparatus according to claim 1, wherein one or more of the sensing units include a narrowband optical sensor configured to define a predetermined wavelength range for the sensing unit.

4. The apparatus according to claim 1, further comprising a third sensing unit configured be have a spectral responsivity in the first predetermined wavelength range.

5. The apparatus according to claim 1, wherein the processing system comprises a neural network.

6. The apparatus according to claim 5, wherein the neural network is a radial basis function or a generalised radial basis function.

7. The apparatus according to claim 1, further comprising a temperature sensor configured to detect operating temperature of the one or more pairs of sensing units.

8. The apparatus according to claim 1, further comprising one or more filters configured to impede wavelengths of light outside a particular predetermined wavelength range from reaching the one or more pairs of sensing units configured to detect light within the particular predetermined wavelength range.

9. The apparatus according to claim 1, wherein a first pair of sensing units are configured to be responsive to the first predetermined wavelength range, a second pair of sensing units are configured to be responsive to a second predetermined wavelength range and a third pair of sensing units are configured to be responsive to a third predetermined wavelength range.

10. The apparatus according to claim 9, wherein the first predetermined wavelength range is red wavelength portion, the second predetermined wavelength range is green wavelength portion, and the third predetermined wavelength range is blue wavelength portion.

11. An apparatus for determining intensities and peak wavelengths in one or more predetermined wavelength ranges of light, the apparatus comprising:
    a) one or more pairs of sensing units for sensing the light, a first sensing unit of a pair configured to sense a first intensity of the light in a first predetermined wavelength range with a first predetermined spectral responsivity and a second sensing unit of a pair configured to sense a second intensity of the light in the first predetermined wavelength range with a second predetermined spectral responsivity; and
    b) a processing system operatively connected to the one or more pairs of sensing units, the processing system configured to determine the intensity and peak wavelength for each of the one or more predetermined wavelength ranges of the light according to one or more predetermined functional relationships between each of the first intensity and second intensity, wherein the first predetermined spectral responsivity is substantially constant for a first portion and ramps down over the predetermined wavelength range and the second predetermined spectral responsivity is substantially constant for the first portion and the predetermined wavelength range subsequently ramps down.

12. The apparatus according to claim 11, wherein one or more of the sensing units include a broadband optical sensor and a filter configured to define a predetermined wavelength range for the sensing unit.

13. The apparatus according to claim 11, wherein one or more of the sensing units include a narrowband optical sensor configured to define a predetermined wavelength range for the sensing unit.

14. The apparatus according to claim 11, further comprising a temperature sensor configured to detect operating temperature of the one or more pairs of sensing units.

15. The apparatus according to claim 11, further comprising one or more filters configured to impede wavelengths of light outside a particular predetermined wavelength range from reaching the one or more pairs of sensing units configured to detect light within the particular predetermined wavelength range.

16. An apparatus for determining intensities and peak wavelengths in one or more predetermined wavelength ranges of light, the apparatus comprising:
   a) one or more pairs of sensing units for sensing the light, a first sensing unit of a pair configured to sense a first intensity of the light in a first predetermined wavelength range with a first predetermined spectral responsivity and a second sensing unit of a pair configured to sense a second intensity of the light in the first predetermined wavelength range with a second predetermined spectral responsivity, the one or more of the sensing units including a broadband optical sensor and a filter configured to define a predetermined wavelength range for the sensing unit, wherein the first sensing unit includes a filter having a first thickness and the second sensing unit includes a filter have a second thickness greater than the first thickness; and
   b) a processing system operatively connected to the one or more pairs of sensing units, the processing system configured to determine the intensity and peak wavelength for each of the one or more predetermined wavelength ranges of the light according to one or more predetermined functional relationships between each of the first intensity and second intensity.

17. The apparatus according to claim 16, further comprising a temperature sensor configured to detect operating temperature of the one or more pairs of sensing units.

18. A method for determining intensity and peak wavelength of light in a predetermined wavelength range, the method comprising the steps of:
   a) sensing a first intensity of the light in the predetermined wavelength range with a first predetermined spectral responsivity;
   b) sensing a second intensity of the light in the predetermined wavelength range with a second predetermined spectral responsivity; and
   c) determining the intensity and peak wavelength in the predetermined wavelength range using a predetermined functional relationship between the first intensity and the second intensity, wherein the step of determining farther comprises the step of analytically sharpening measured spectral responsivities of the one or more pairs of sensing units.

19. The method according to claim 18, wherein analytically sharpening is performed using a sharpening transform.

20. The method according to claim 19, wherein the sharpening transform is configured to reduce signal to noise ratio.

21. An apparatus for determining intensity and peak wavelength in a predetermined wavelength range of light, the apparatus comprising:
   a) a first sensing unit for sensing the light, the first sensing unit configured to sense a first intensity of the light in the predetermined wavelength range with a first predetermined spectral responsivity; and
   b) a processing system operatively connected to the first sensing unit, the processing system configured to analytically sharpen the first predetermined spectral responsivity of the first sensing unit, thereby generating a second intensity of the light, the processing system further configured to determine the intensity and peak wavelength for the predetermined wavelength range of light according to one or more predetermined functional relationships between the first intensity and second intensity.

* * * * *